US008121792B2

(12) United States Patent
Hsu et al.

(10) Patent No.: US 8,121,792 B2
(45) Date of Patent: Feb. 21, 2012

(54) INTEGRATION OF GEOMECHANICS AND SEISMIC ANALYSIS FOR PASSIVE SEISMIC FEASIBILITY ANALYSIS

(75) Inventors: Sheng-Yuan Hsu, Sugar Land, TX (US); Anupama Venkataraman, Houston, TX (US); Edmond K. Sze, Houston, TX (US); Kevin H. Searles, Kingwood, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 543 days.

(21) Appl. No.: 12/388,303

(22) Filed: Feb. 18, 2009

(65) Prior Publication Data

US 2009/0248312 A1 Oct. 1, 2009

Related U.S. Application Data

(60) Provisional application No. 61/072,425, filed on Mar. 31, 2008.

(51) Int. Cl.
*G01V 1/00* (2006.01)

(52) U.S. Cl. .......... 702/15; 703/2

(58) Field of Classification Search .......... 702/13, 702/14, 15, 17, 182–185, 188; 703/1–3
See application file for complete search history.

(56) References Cited

U.S. PATENT DOCUMENTS

| | | | | |
|---|---|---|---|---|
| 5,502,687 | A | 3/1996 | Mackay | 367/54 |
| 5,619,475 | A * | 4/1997 | Winkler | 367/27 |
| 6,502,037 | B1 * | 12/2002 | Jorgensen et al. | 702/14 |
| 6,556,922 | B2 | 4/2003 | Anno | 702/17 |
| 6,714,873 | B2 * | 3/2004 | Bakulin et al. | 702/14 |
| 6,980,482 | B2 | 12/2005 | Faichney et al. | 367/73 |

OTHER PUBLICATIONS

Abercrombie, R. E. (1995) "Earthquake Source Scaling Relationships From -1 to 5 ML Using Seismograms Recorded at 2.5 km Depth," *J. Geophys. Res.*, 100, pp. 24015-24036.

Boler, F. M. et al. (1986) "Radiated Seismic Energy and Strain Energy Release in Laboratory Dynamic Tensile Frature," *Pure Appl. Geophys.*, 124, pp. 1420-9136.

Boore, D. M. et al. (1984) "Average Body-Wave Radiation Coefficients," *Bull. Seismol. Soc. Am.*, 74, pp. 1615-1621.

Brune (1970) "Tectonic Stress and the Spectra From Seismic Shear Waves Earthquakes," *J. Geophys. Res.*, 75, pp. 4997-5009.

Dahlen, F. A. (1977) "The Balance of Energy in Earthquake Faulting," *Geophys. J. R. astr. Soc.*, 48, pp. 239-261.

Edwards, P. B. (1992) "The Untapped Potential of Seismic Imaging," *GEOPHYSICS: The Leading Edge of Exploration*, Aug. 1992, pp. 29-34.

Hanks, T. C. (1977) "Earthquake Stress Drops, Ambient Tectonic Stresses and Stresses That Derive Plate Motions," *Pure App. Geophys.*, 115, pp. 441-458.

(Continued)

*Primary Examiner* — Edward Raymond

(57) ABSTRACT

One or more techniques for determining time-varying stress and strain fields within a subsurface region include integrating a seismic model (110) of a reservoir within the subsurface region with a geomechanical model (140) of the subsurface region. An estimate of the time-varying stress and strain fields within the subsurface region during production of the reservoir are determined, wherein the estimate is based on the integration of the seismic model with the geomechanical model. The integration of the seismic model with the geomechanical model can be used to predict the feasibility of passive seismic monitoring for a reservoir within a subsurface region (170).

32 Claims, 8 Drawing Sheets
(3 of 8 Drawing Sheet(s) Filed in Color)

OTHER PUBLICATIONS

Hiramatsu et al. (2002) "Scaling Law Between Corner Frequency and Seismic Moment of Microearthquakes: is the Breakdown of the Cube Law a Nature of Earthquakes?" *Geophys. Res. Lett.*, 29, pp. 1211, doi:10.1029/2001GL013894.
Ide, S. et al. (2003) "Apparent Break in Earthquake Scaling Due to Path and Site Effects on Deep Borehole Recordings," *J. Geophys. Res.*, 108, pp. 2271, doi:10.1029/2001JB001617.
Imanishi et al. (2004) "Source Parameters and Rupture Velocities of Microearthquakes in Western Nagano, Japan, Determined Using Stopping Phases," *Bull. Seismol. Soc. Am.*, 94, pp. 1762-1780.
Jost, M. L. et al. (1998) "Source Parameters of Injection-Induced Microearthquakes at 9km Depth at the KTB Deep Drilling Site, Germany," *Bull. Seismol. Soc., Am.*, 88, pp. 815-832.
Kanamori, H. et al. (1975) "Theoretical Basis of Some Empirical Relations in Seismology," *Bull. Seismol. Soc. Am.*, 65, pp. 1073-1095.
Kanamori, H. et al. (1993) "Determination of Earthquake Energy Release and ML Using TERRAscope," *Bull. Seismol. Soc. Am.*, 83, pp. 330-346.
Kanamori, H. (2001) "Energy Budget of Earthquakes and Seismic Efficiency,"In Teisseyre, R., and Majewski, E., eds., *Earthquake Thermodynamics and Phase Transformations in the Earth's Interior*, New York, Academic Press, pp. 293-305.
Knopoff, L. (1958) "Energy Release in Earthquakes," *Geophy. J.*, 1, pp. 44-52.
Kostrov, B. (1974) "Seismic Moment and Energy of Earthquakes, and Seismic Flow of Rock Izv.," *Acad. Sci., USSR, Phys. Solid Earth* (Engl. Transl.) 1, pp. 23-40.
Maxwell, S. C. et al. (2003) "Assessing the Feasibility of Reservoir Monitoring Using Induced Seismicity," 65th Conference and Exhibition, *EAGE*, Stavenger, Norway, 6 pgs.
McGarr, A. (1994) "Some Comparisons Between Mining-Induced and Laboratory Earthquakes," *Pure Appl. Geophys.*, 142, pp. 467-489.
McGarr, A. (1999) "On Relating Apparent Stress to the Stress Causing Earthquake Fault Slip," *J. Geophys. Res.*, 104, pp. 3003-3011.
Palvis, G. L. (1986) "Appraising Earthquake Hypocenter Location Errors: a Complete, Practical Approach for Single-Event Locations," *Bull. Seismol. Soc. Am.*, 76, pp. 1699-1717.
Richardson, E. et al. (2002) "Seismicity in Deep Gold Mines of South Africa: Implications for Tectonic Earthquakes," *Bull. Seismol. Soc. Am.*, 92, pp. 1766-1782.
Savage, J. C. et al. (1978) "Gravitational Energy and Faulting," *Bull. Seismol. Soc. Am.*, 68, pp. 1613-1622.
Somerville et al. (1987) "Comparison of Source Scaling Relations of Eastern and Western North American Earthquakes," *Bull. Seismol. Soc. Am.*, 77, pp. 322-346.
Venkataraman, A. et al. (2002) "Observational Constraints on the Fracture Energy of Subduction Zone Earthquakes," *J. Geophys. Res.*, 109, B0530210.1029/2003JB002549.
von Seggern et al. (1976) "Seismic Threshold Determination," *Bull. Seismol. Soc. Am.*, 66, pp. 753-788.
von Seggern (2004) "Seismic Background Noise and Detection Threshold in the Southern Great Basin Digital Seismic Network," *Bull. Seismol. Soc. Am.*, 94, pp. 2280-2298.
Yamada, T. et al. (2005) "Radiation Efficiency and Apparent Stress of Small Earthquakes in a South African Gold Mine," *J. Geophy. Res.*, 110, B01305, doi:10.1029/2004JB003221.

* cited by examiner

INTEGRATION OF GEOMECHANICS AND SEISMIC ANALYSIS FOR PASSIVE SEISMIC FEASIBILITY ANALYSIS

CROSS REFERENCE TO RELATED APPLICATIONS

This application claims the benefit of U.S. Provisional application 61/072,425 which was filed on Mar. 31, 2008.

TECHNICAL FIELD

This description relates generally to the field of assessing the feasibility of conducting a passive seismic survey in a producing field. Specifically, this description relates to one or more systems and methods for assessing the feasibility of conducting a passive seismic survey in a producing field by integrating geomechanics and seismic analysis.

BACKGROUND

Throughout the life of an oil and gas field, the extraction and injection of fluids results in changes in the in situ stress and physical properties of the reservoir. Microseismicity and surface heave/subsidence are among the common responses to these injection- and production-induced stress perturbations.

A passive seismic survey relies upon passive seismology, e.g., seismology that does not rely upon the use of a controlled seismic source of energy for sending sound waves into the earth at predetermined locations, such as dynamite, air guns and/or vibrators. In contrast to active seismic surveys, passive seismic surveys typically rely upon natural or induced teleseismic events and/or microseismic activity that may be recorded at one or more recording location(s). In the case of injection- and production-induced stress perturbations, a successful passive seismic survey requires a determination of when the induced stress change is expected to be large enough to generate microearthquakes. The expected magnitude and recurrence rate of these events should also be determined. The detection capability of a specific seismic array should be determined, and it should be determined if the microseismic signal amplitudes are large enough to be detected in a noisy environment.

The present inventors have developed one or more techniques that utilize coupled geomechanical-reservoir simulation that can handle complex 3-D geologic structures and reservoir pressure variations during production to quantify the presence, timing, location, and magnitude of microseismicity in and around the reservoir. The integration of geomechanical modeling with seismic modeling permits an accurate calculation of the probability of detection of seismic events given an acquisition network in the area.

SUMMARY

In one general aspect, a method for determining time-varying stress and strain fields within a subsurface region includes integrating a seismic model of a reservoir within the subsurface region with a geomechanical model of the subsurface region. An estimate of the time-varying stress and strain fields within the subsurface region during production of the reservoir are determined, wherein the estimate is based on the integration of the seismic model with the geomechanical model.

Implementations of this aspect may include one or more of the following features. For example, the seismic model may provide a reservoir simulation of production related fluid-flow within the reservoir. The geomechanical model may provide an estimate of rock and fracture mechanics within the subsurface region. The integration of the seismic model of the reservoir with the geomechanical model may include integrating a reservoir simulation of the reservoir during production, a geologic model of the subsurface region, and/or well log and core test data with the geomechanical model. The integration of the seismic model of the reservoir with the geomechanical model may include creating a three-dimensional finite element model of the subsurface region incorporating parameters associated with structure of the reservoir and overburden of the region, with rock material properties and failure criteria.

The seismic model and the geomechanical model may be generated or existing models, wherein the seismic model includes a reservoir flow simulation including pressure and temperature changes within the reservoir and the geomechanical model includes a stress analysis of the subsurface region. Solution histories of pressure and temperature from the seismic model may be mapped to the geomechanical model as boundary conditions.

In another general aspect, a method for determining feasibility of a passive seismic survey for a subsurface region includes integrating a seismic model of a reservoir within the subsurface region with a geomechanical model of the subsurface region to form an integrated, three-dimensional model of the subsurface region. An estimate of the time-varying stress and strain fields within the subsurface region during production of the reservoir are determined, wherein the estimate is based on the integrated, three-dimensional model. Earthquake energetics and consistency are analyzed from the integrated, three-dimensional model. Seismic wave propagation is modeled to model and correct for path effects to predict seismic signal amplitudes for a given seismic moment for at least one receiver location. One or more seismic thresholds for a seismic data acquisition network are determined, wherein the at least one receiver is part of the seismic data acquisition network.

Implementations of this aspect may include one or more of the following features. For example, the seismic model may provide a reservoir simulation of production related fluid-flow within the reservoir. The geomechanical model may provide an estimate of rock and fracture mechanics within the subsurface region. The seismic model of the reservoir may be integrated with the geomechanical model by integrating a reservoir simulation of the reservoir during production with a geologic model of the subsurface region, and/or well log and core test data with the geomechanical model. The integrated, three-dimensional model may include a three-dimensional finite element model of the subsurface region incorporating parameters associated with structure of the reservoir and overburden of the region with rock material properties and failure criteria.

The seismic model and/or the geomechanical model may be generated and/or existing, wherein the seismic model includes a reservoir flow simulation including pressure and temperature changes within the reservoir and the geomechanical model includes a stress analysis of the subsurface region. The solution histories of pressure and temperature from the seismic model may be mapped to the geomechanical model as boundary conditions. Analyzing earthquake energetics and consistency may include predicting changes in total strain energy with time. Total radiated energy available for seismic wave propagation may be calculated from the predicted changes in total strain energy with time. Seismic moment due to induced stress perturbations within the subsurface region may be estimated, wherein the induced stress perturbations may include injection and production-induced stress perturbations, or natural stress perturbations.

Analyzing earthquake energetics may include determining average displacement, radiated seismic energy, and total recoverable strain field from the geomechanical model. Seismic wave propagation may be modeled to model and correct for path effects to predict seismic signal amplitudes for a given seismic moment for at least one receiver location. Determining seismic thresholds for the seismic data acquisition network may include determining an estimate of detection capability for the seismic data acquisition network based on seismic signal strength, seismic background noise, seismic recurrence rates, and recording equipment. The estimate may include an estimated magnitude at which more than 90 percent of a plurality of receiver stations can detect an event or seismic source. A detection threshold map may be generated which contains a detection threshold magnitude for each grid of the integrated, three-dimensional model. A passive seismic survey of the reservoir may be conducted during production of hydrocarbons from the reservoir. The passive seismic survey may be used to monitor overpressure and/or seal breach risk in the reservoir based on the results of the passive seismic survey.

In another general aspect, a tangible computer-readable storage medium having embodied thereon a computer program configured to, when executed by a processor, generate an integrated, three-dimensional model of a subsurface region based on geomechanical and seismic analysis of the subsurface region, the medium comprising one or more code segments configured to integrate a seismic model of a reservoir within the subsurface region with a geomechanical model of the subsurface region to form the integrated, three-dimensional model of the subsurface region. The seismic model provides a reservoir simulation of production related fluid-flow within the reservoir and the geomechanical model provides an estimate of rock and fracture mechanics within the subsurface region. The one or more code segments are configured to determine an estimate of the time-varying stress and strain fields within the subsurface region during production of the reservoir, wherein the estimate is based on the integrated, three-dimensional model.

Implementations of this aspect may include one or more of the following features. For example, the code segments may be configured to analyze earthquake energetics and consistency from the integrated, three-dimensional model, model seismic wave propagation to model and correct for path effects to predict seismic signal amplitudes for a given seismic moment for at least one receiver location, and determine a seismic threshold for a seismic data acquisition network, wherein the at least one receiver is part of the seismic data acquisition network. The code segments may be configured to integrate the seismic model of the reservoir with the geomechanical model by integrating a reservoir simulation of the reservoir during production with a geologic model of the subsurface region, and/or well log and core test data with the geomechanical model.

BRIEF DESCRIPTION OF THE DRAWINGS

The patent or application file contains drawings executed in color. Copies of this patent or patent application publication with color drawings will be provided by the Office upon request and payment of the necessary fee.

DETAILED DESCRIPTION

The techniques presented hereinafter generally relate to passive seismic surveys, e.g., based on injection- and production-induced stress perturbations of a subsurface region, e.g., a subsurface hydrocarbon reservoir and/or regions within or near a subsurface hydrocarbon reservoir. A typical passive seismic project includes three stages: i) feasibility study; ii) pilot acquisition project and data analysis, and iii) long-term or permanent monitoring.

Currently microseismic feasibility studies focus mostly on acquisition system design and event location uncertainties, with little or no analysis of the size and occurrence of micro-earthquakes induced by production and injection. Moreover, information on local tectonic seismicity often cannot be obtained from the literature and/or from seismological databases because many oil and gas fields are located in seismically quieter regions where regional seismic network density is sparse, and/or the size of the micro-earthquakes usually falls below the detection threshold. Thus, the potential availability of natural or induced seismic sources for the passive survey is usually not assessed until the completion of a pilot field experiment. However, pilot projects can be expensive, especially if the pilot projects are conducted in an offshore setting.

In some studies relating to induced stress perturbations, failure probability is calculated based on the proportion of failed, to non-failed realizations in a model subjected to the Mohr-Coulomb failure criterion and random sampling of input parameters, such as the principal stresses, pore pressure, Biot's constant, stress orientation, friction angle, and cohesion. However, this approach does not account for relatively complicated geology and/or reservoir pressure changes. Two dimensional (2-D) geomechanical modeling on simple geologic structures to assess the potential of brittle failure in the subsurface is described by Maxwell, S. C., Urbancic T. I., and McLellan, P. in the paper "Assessing the feasibility of reservoir monitoring using induced seismicity," 65th Conference and Exhibition, *EAGE, expanded abstract* (2003). However, any implied integration of the 2-D geomechanical modeling with seismic modeling is minimal.

The present techniques quantify the potential magnitude, timing, and detectability of microseismic events using results from integrated geomechanical and seismic modeling. For example, the present techniques may utilize available geologic and well data, and integrate 3-D forward modeling techniques, such as geomechanical modeling, reservoir simulation, and/or seismic wave propagation.

Figure 1:
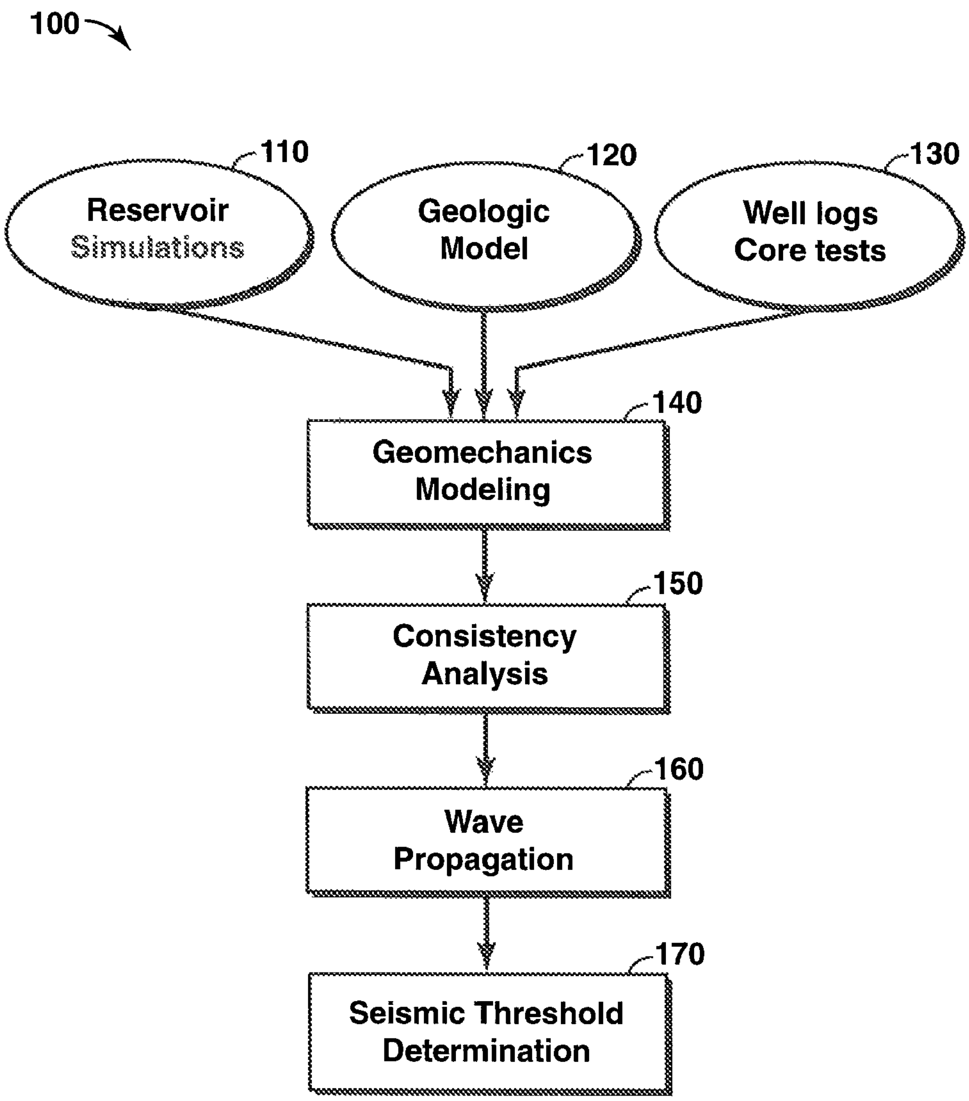
FIG. 1 is a flowchart of an exemplary process for determining feasibility of a passive seismic survey.

FIG. 1 is a flowchart of an exemplary process 100 for determining feasibility of a passive seismic survey of a subsurface region. Referring to FIG. 1, process 100 includes integrating one or more of reservoir simulation 110, e.g., a seismic model, geologic modeling 120, and/or well logs and/or core testing 130 with geomechanical modeling. For example, three dimensional (3-D) finite-element geomechanical modeling 140 is coupled to reservoir simulation 110 to estimate the time-varying stress and strain fields in the overburden and reservoir within a target subsurface region. The complex interactions between production related fluid-flow, and rock and fracture mechanics are modeled through this integrated technique. Specifically, the 3-D overburden and reservoir structure is parameterized by adaptive finite element meshes. Rock material properties and failure criteria derived from core testing and well log data 130 are also incorporated in the modeling, e.g., the forward modeling of geomechanical and seismic analysis.

In block 150, earthquake energetics and consistency are analyzed. Specifically, predictions of changes in total strain energy with time, e.g., both recoverable and dissipated energies, are made from the geomechanical modeling 140. From these energy predictions and reasonable values of seismic efficiencies, the total radiated energy available for seismic wave propagation is calculated. Assuming a reasonable range of static stress drop for the microearthquakes, the size of events, e.g., seismic moment, are estimated due to the injection and production-induced stress perturbations.

In block 160, seismic wave propagation modeling is performed. During the seismic wave propagation modeling 160, appropriate corrections for path effects are applied to more accurately predict the microseismic signal amplitudes for a given seismic moment at each receiver location, e.g., such as each geophone in a network of geophones. Forward wave propagation modeling is performed to model and correct for path effects due to geometric spreading, reflection/transmission loss, and anelastic attenuation.

In block 170, seismic threshold analysis is performed. The seismic network detection threshold is estimated by incorporating knowledge or assumptions on ambient and cultural noise in the vicinity of the seismic network to obtain the probability of detecting an event by the network. A predicted threshold map for the network can also be constructed. Accordingly, various acquisition designs can be evaluated quantitatively to ensure that signals above the detection threshold can be recorded.

Source location uncertainties may also be analyzed as a part of process 100 (but not shown), e.g., after block 170. Given the velocity structure of the subsurface region, reasonable assumptions on the size of time residuals of P- and S-wave arrivals used in locating the events are used to calculate location error estimates. Further, process 100 may be extended to include conducting a passive seismic survey after a target subsurface region has been identified and process 100 as shown in FIG. 1 has been implemented.

With respect to blocks 110-130 and 140, e.g., the integrated geomechanics-reservoir modeling, the following preferred approach is provided as a detailed example of block 140. These simulators lack the capability to solve earth stress within and outside the reservoir, because most existing reservoir flow simulators only predict pressure and temperature change within the reservoir. Therefore, the present inventors have determined that a separate geomechanical simulation is beneficial to solve for stress changes. For example, a sequentially coupled technique is adopted to impose the solution histories of pressure and temperature on the geomechanical model for stress analysis. The mesh grids are most likely not coincident because flow and stress analyses are done separately. A 3-D distance weighting, mapped scheme is formulated to map the pressure and temperature to the geomechanical model as boundary conditions.

The 3-D weighting scheme is formulated whereby nodal quantities for the geomechanical simulation are mapped from a spatial neighborhood of reservoir simulation gridpoint quantities. The weighting scheme calculates the nodal quantity p(r) in the geomechanical model based on the nodal quantity $P_i$ from the reservoir analysis model through the following equation, $$p(r) = \frac{\sum_i w_i P_i}{\sum_i w_i} \tag{1}$$

in which, $$\frac{1}{w_i} = \frac{(r_x - \xi_x)^n}{a^n} + \frac{(r_y - \xi_y)^n}{b^n} + \frac{(r_z - \xi_z)^n}{c^n} \tag{2}$$

where r is the position vector of the geomechanical node, ξ is the position vector of the reservoir analysis node, respectively, and a, b, c are the semi axes of the three principal directions of a searching ellipsoidal domain, n is the power of weighting and $w_i$ is the distance based weight. The property is mapped based on the property, e.g. pressure or temperature, of surrounding reservoir analysis gridpoints inside the searching ellipsoid.

For example, applicable nomenclature for the 3-D weighting scheme is as follows:

p—property at geomechanical node

Figure 2:
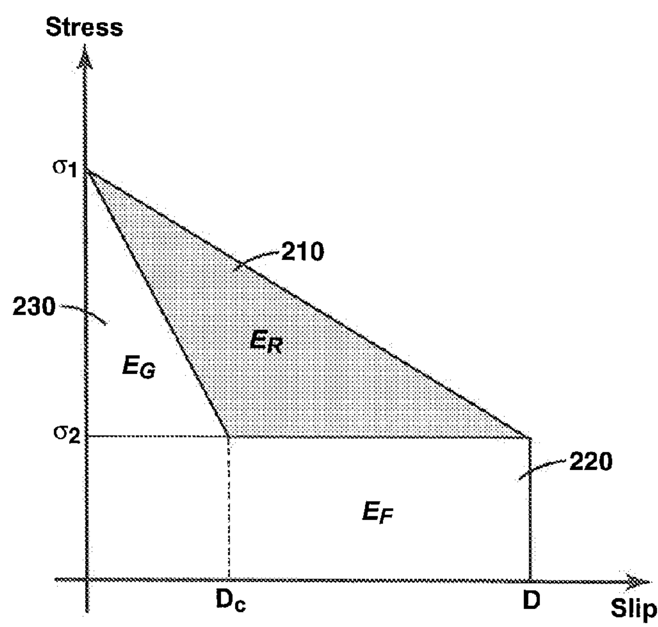
FIG. 2 is a graphical view of an exemplary energy budget for seismic events based on fault slip-weakening models.

P—property at reservoir gridpoints $w_i$—distance-based weight r—geomechanical nodal position vector $r_x$—x component of geomechanical nodal position vector, m $r_y$—y component of geomechanical nodal position vector, m $r_z$—z component of geomechanical nodal position vector, m ξ—reservoir analysis nodal position vector $\xi_x$—x component of reservoir analysis nodal position vector, m $\xi_y$—y component of reservoir analysis nodal position vector, m $\xi_z$—z component of reservoir analysis nodal position vector, m a—semi axis of searching ellipsoid in x direction, m b—semi axis of searching ellipsoid in y direction, m c—semi axis of searching ellipsoid in z direction, m n—exponent of weighting With respect to block 150, e.g., analyzing earthquake energetics and consistency analysis, the following exemplary techniques are applicable for the consistency analysis of process 100. In an elastic material, the work done during loading is stored as recoverable strain energy ($E_r$) or potential energy in the solid. During the dislocation of a fault, the potential energy stored in earth is released which is the sum of strain energy ($E_e$) and gravitational energy ($E_g$). FIG. 2 is a graphical view of an exemplary energy budget 200 for seismic events based on fault slip-weakening models. Referring to FIG. 2, the released energy has three components: radiated energy ($E_R$) 210, frictional energy ($E_F$) 220, and fracture energy ($E_G$) 230. The radiated energy 210, frictional energy 220, and fracture energy 230 are show graphically along an x-y axis, wherein the x-axis is the slip (displacement) and the y-axis is the stress. Radiated energy 210 is the proportion of energy required to generate seismic waves. Frictional forces acting on the fault transform kinetic energy into thermal energy, e.g., frictional energy 220. Fracture energy 230 is associated with the creation of new surfaces during rupture propagation.

In summary, the energy budget of an earthquake, such as that described by Kanamori, H., in "Energy budget of earthquakes and seismic efficiency," in Teisseyre, R., and Majewski, E., eds., *Earthquake thermodynamics and phase transformations in the Earth's Interior*, New York, Academic Press, pp. 293-305. (2001), is $$\Delta E_r = \Delta(E_e + E_g) = E_R + E_F + E_G. \tag{3}$$

If the overall vertical movement of the deforming region associated with the earthquake is small, the gravitational energy ($E_g$) is assumed to be negligible. A range of frictional strength of faults is used in the modeling. Three output parameters are stored from the geomechanics modeling for further analysis: (1) the average displacement ($\overline{D}$), (2) radiated seismic energy ($E_R$), and (3) the total recoverable strain field ($\Delta E_r$). The three parameters enable the scientist to obtain three different estimates of seismic moment which should be consistent with each other. In addition, the three parameters can be used to verify that the geomechanical modeling is in agreement with laboratory and field observations of earthquakes.

In the first case, e.g., average displacement ($\overline{D}$), given the fault location and geometry from seismic interpretation, one can estimate the seismic moment, $M_0$, using the average fault slip and fault surface area. Both the average fault slip and fault surface area can be obtained readily as the geomechanical modeling output parameters. The seismic moment, $M_0$, provides an accurate measure of the size of an earthquake. The seismic moment, $M_0$, is equal to the product of the fault surface area (A), the rigidity of the rock ($\mu$), and the average slip on the fault ($\overline{D}$).

In the second case, e.g., radiated seismic energy ($E_R$), the seismic moment, $M_0$, is calculated from the radiated seismic energy, $E_R$. The radiated seismic energy $E_R$ represents the maximum seismic energy release over the time considered. Seismic moment ($M_0$) measures the amount of radiated seismic energy and is proportional to the static stress drop, $\Delta\sigma$, wherein:

$$E_R \approx \frac{\Delta\sigma}{2\mu} M_0 \tag{4}$$

Static stress drop $\Delta\sigma$ is the difference between the state of stress at a point on the fault before and after rupture, and its value can be obtained from the geomechanical modeling. The scaled energy ratio, $E_R/M_0$, is commonly known as a measure of the energy density of earthquakes.

In the third case, e.g., using the total recoverable strain field ($\Delta E_r$), radiated seismic energy, and the seismic moment, which can each be estimated from the geomechanical modeling, the resulting seismic efficiency, $\eta$, is calculated. The seismic efficiency, $\eta$, is defined as the ratio of radiated seismic energy to the change of strain energy, specifically:

$$\eta = \frac{E_R}{E_R + E_F + E_G} = \frac{E_R}{\Delta R_r}. \tag{5}$$

Studies on laboratory stick-slip friction experiments and shallow earthquakes suggest that the ratio of radiated seismic energy to the change of strain energy, known as seismic efficiency ($\eta$), tends to be small and have an upper bound of approximately 0.06. For example, McGarr describes exemplary studies in "Some comparisons between mining-induced and laboratory earthquakes," *Pure Appl. Geophys.,* 142, pp. 467-489 (1994); and "On relating apparent stress to the stress causing earthquake fault slip," *J. Geophys. Res.,* 104, pp. 3003-3011 (1999).

$$E_R = \eta\Delta E_r = \Delta E_r - (E_F + E_G) \tag{6}$$

The drop of static friction coefficient to its dynamic value according to $\mu_s/\mu_d \approx 1.18$ limits the seismic efficiency to this low value. The opposing end-member is a creeping fault. This kind of fault radiates no seismic energy because the available potential energy is completely used to overcome friction and create new surface (i.e., $\Delta E_r = E_F + E_G$), and $E_R$ equals zero. Thus, we can compare the seismic efficiency from modeling to that of laboratory measurements. According to the conclusions of previous studies, we expect $0 \leqq E_R \leqq 0.06 E_r$. This should cover scenarios ranging from a creeping fault and the case which $\eta \leqq 0.06$.

With respect to block 160, e.g., wave propagation modeling, a preferred seismic wave propagation modeling technique is described hereinafter. Accounting for path effects on small microearthquakes is useful because a large percentage of their energy resides in the strongly attenuating higher frequencies. Therefore, robust estimates of signal amplitude at the receiver is beneficial to acquisition design in passive seismic surveys, e.g., array location, borehole versus surface array, geometry. Radiation patterns and path effects, such as geometric spreading, reflections, mode conversions, and anelastic attenuation, are accounted for in wave propagation 160. The radiation patterns and path effects are described in further detail in Boore, D. M. and Boatwright, J., "Average body-wave radiation coefficients," *Bull. Seismol. Soc. Am.,* 74, pp. 1615-1621 (1984). In a homogeneous medium, the far-field displacement equation in cylindrical coordinates for P- or S-waves is expressed as follows:

$$u(t) = \frac{R(\theta,\phi)}{4\pi\rho v^3 r}\dot{M}\left(t - \frac{r}{v}, \theta, \phi\right)e^{-\frac{\pi f r}{vQ}} \tag{7}$$

where $R(\theta,\phi)$ is the radiation pattern factor, and is expressed as follows:

$$R(\theta,\phi) = \begin{cases} \sin^2(\theta)\sin(2\phi) & \text{for } P\text{-wave} \\ \frac{1}{2}\sin(2\theta)\sin(2\phi) & \text{for } SH\text{-wave} \\ \sin(\theta)\cos(2\phi) & \text{for } SV\text{-wave} \end{cases} \tag{8}$$

$\rho$ is density, $\nu$ is the velocity in the vicinity of the source, r is the distance from seismic source to receiver, Q is the attenuation quality factor, and $\dot{M}(t,\theta,\phi)$ is the moment rate function in the $(\theta,\phi)$ direction.

The moment rate function of an earthquake is the time-derivative of the dislocation history of a particle on the fault. It controls the amplitude of the body waves and is commonly referred to as the source time function. The fault dimensions for microearthquakes should be small relative to the source-receiver distance and can be treated as a point source for practical purposes. With this point source approximation, the moment rate function becomes independent of station location. Empirically, the moment rate function based on the omega-square source model, e.g., as described by Brune in "Tectonic stress and the spectra from seismic shear waves earthquakes," *J. Geophys. Res.,* 75, pp. 4997-5009 (1970), is found to exhibit $f^{-2}$ decay of amplitudes beyond a corner frequency, $f_c$:

$$S(f) = \dot{M}(f) = M_0 \frac{f_c^2}{f^2 + f_c^2}. \tag{9}$$

Taking the point-source approximation and substituting equation (9) into equation (7), the displacement spectrum in frequency domain is expressed as follows:

$$u(f) = \frac{R(\theta, \phi)}{4\pi\rho v^3 r} e^{-\frac{\pi f r}{vQ}} M_0 \frac{f_c^2}{f^2 + f_c^2} \tag{10}$$

The calculation is simplified as amplitude prediction is of interest, while waveform modeling is not of interest. Instead, the magnitude of $\dot{M}(t,\theta,\phi)$, which is the seismic moment divided by the time duration of the earthquake source ($M_0/T$), is the real focus of the calculation. Studies were conducted to investigate the empirical scaling relations between the seismic moment and the source duration or dimension, and in general found the relationship $M_0 \propto T^p$, where $p \approx 3$ (FIG. 2). Exemplary studies include Somerville et al., "Comparison of source scaling relations of eastern and western North American earthquakes," *Bull. Seismol. Soc. Am.,* 77, pp. 322-346 (1987); Hiramatsu et al., "Scaling law between corner frequency and seismic moment of microearthquakes: is the breakdown of the cube law a nature of earthquakes?" *Geophys. Res. Lett.,* 29, pp. 1211, doi:10.1029/2001GL013894. (2002); and Imanishi et al., "Source parameters and rupture velocities of microearthquakes in Western Nagano, Japan, determined using stopping phases," *Bull. Seismol. Soc. Am.,* 94, pp. 1762-1780 (2004). Ray-tracing is employed in a preferred technique to calculate the path effect portion in equation (10) for areas with complex velocity and attenuation structures.

The seismic moment, corner frequency, and static stress drop are related through the equation (Brune, 1970), expressed as follows:

$$f_c = 4.9 \times 10^6 v \left(\frac{\Delta\sigma}{M_0}\right)^{1/3}. \tag{11}$$

$$T_d = f_c^{-1}$$

With respect to block 170, a preferred technique for determining seismic threshold is described in greater detail hereinafter. An accurate determination of seismic threshold requires consideration of (1) seismic signal strength; (2) seismic background noise; (3) seismic recurrence rates, and (4) recording equipment, to quantify or evaluate station and network detection capability. For example, the seismic threshold of a seismic acquisition network is the estimated magnitude at which more than 90 percent of the total number of stations can detect the event of that magnitude.

An investigation of the expected background noise level of the seismic array should be conducted in a feasibility study, to compare it with the anticipated signal strength of microearthquakes. High noise levels limit the detection capability of a network. A sample of seismic noise records from a similar geographic setting, e.g., onshore, shallow-water, deepwater, borehole, basin; and operating environment are each analyzed. The ideal sampling approach should ensure that background noise is well sampled under different types of meteorological conditions and cultural effects. For example, for each excerpted sample of microseism record, a 1-second moving window is applied to compute the mean and rms values. The rms values of the noise are plotted and studies have shown that the rms values of the noise are usually log-normally distributed, e.g., such as those studies described by von Seggern, in "Seismic background noise and detection threshold in the Southern Great Basin Digital Seismic Network," *Bull. Seismol. Soc. Am,* 94, pp. 2280-2298, (2004).

The threshold of a single station is detected as follows. Both signal and noise amplitudes are assumed to follow log-normal distributions. Assuming statistical independence of the observations, the detection probability for any given event such that $\log A_m - \mu > 0$ e.g., a detection is declared whenever the signal exceeds the noise level, generalized to each of the magnitudes, m, is expressed as follows:

$$P(m) = \Phi\left[\frac{\log A_i(m) - (\mu_i + \log R)}{(\sigma_s^2 + \sigma_n^2)^{1/2}}\right] = \Phi_i \tag{12}$$

where $\Phi$ is the unit normal probability distribution, $A_i$ is the calculated rms amplitude at the station i, $\mu_i$ is the average rms logarithmic noise level at station i, $\sigma_s^2$ and $\sigma_n^2$ are the variances of logarithmic signal and noise, respectively, and R is the signal to noise (S/N) ratio required for detection. If signals have nearly the same frequency content as the background noise, a relatively high R may be set for calculating detection thresholds. On the other hand, specific processing techniques, e.g., such as commercially available passive seismic emission tomography (PSET™), can be implemented on datasets that have low S/N ratio (R<1).

The detection threshold of a seismic network is determined as follows. The probability of detection is assumed to be statistically independent among stations in the network. As described by von Seggem (2004) and Blandford, in "Seismic threshold determination," *Bull. Seismol. Soc. Am.,* 66, pp. 753-788 (1976), the probability that exactly k out of n stations in the network will detect the event of magnitude m is $$P_{k,n}(m) = S_k - \binom{k+1}{k} S_{k+1} + \binom{k+2}{k} S_{k+2} - \ldots \pm \binom{n}{k} S_n \tag{13}$$

where $$S_1 = \sum_i \Phi_i,\ S_2 = \sum_{ij} \Phi_i \Phi_j,\ S_3 = \sum_{ijk} \Phi_i \Phi_j \Phi_k,\ \text{etc} \tag{14}$$

The $P_{k,n}(m)$ probabilities in (5) are independent and sum to unity over k=0 to n. The probability that at least k out of n stations will detect the event is $$P_{\geq k,n}(m) = \sum_{l=k}^{n} P_{l,n}(m). \tag{15}$$

This is the relevant probability of detection curve for a given network of stations. As mentioned above, an upper limit of 90% of $P_{\geqq k,n}(m)$ is defined as the threshold magnitude of the network:

$$P_{\geqq k,n}(m) = 0.9 \tag{16}$$

A detection threshold map is generated following an approach similar to von Seggern (2004). The detection threshold magnitude is determined for each regular grid of the 3D model.

Referring to FIGS. 3A-6, the exemplary field is a deepwater field wherein process 100 has been applied to determine the feasibility of conducting passive seismic survey(s). In the exemplary field, gas injection is planned for both pressure maintenance and gas storage, where the formation pressure is close to the fracture gradient. Accordingly, the feasibility study, e.g., process 100, is beneficial in evaluating the feasibility of applying passive seismic technology to the exemplary field. For example, passive seismic monitoring is used (after a determination of the feasibility of passive seismic survey with process 100) for monitoring reservoir overpressure and/or seal breach risk in the reservoir.

Figure 3A:
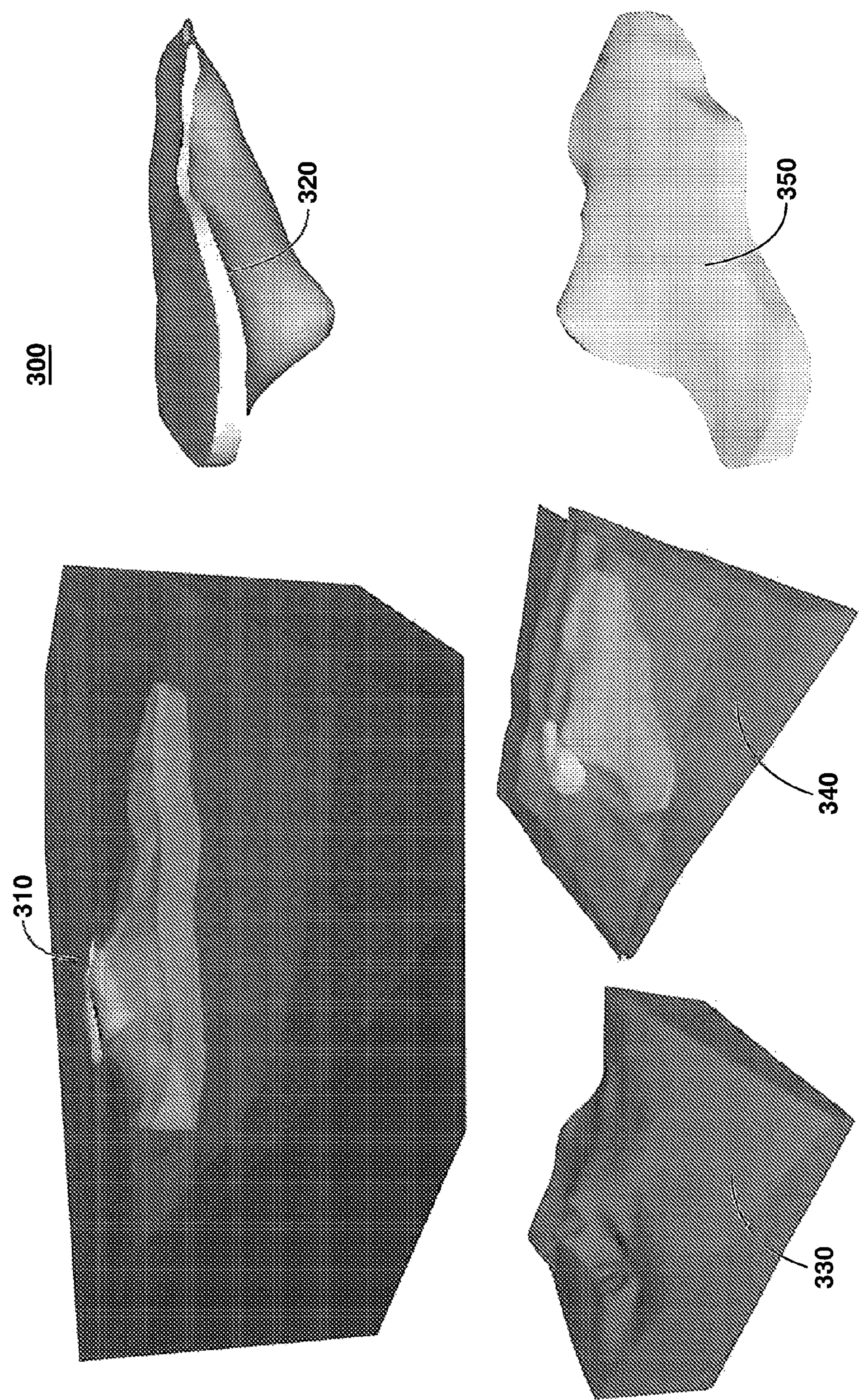
FIG. 3A is a collection of perspective views of a three-dimensional (3-D) geomechanics model for an exemplary field.
Figure 3B:
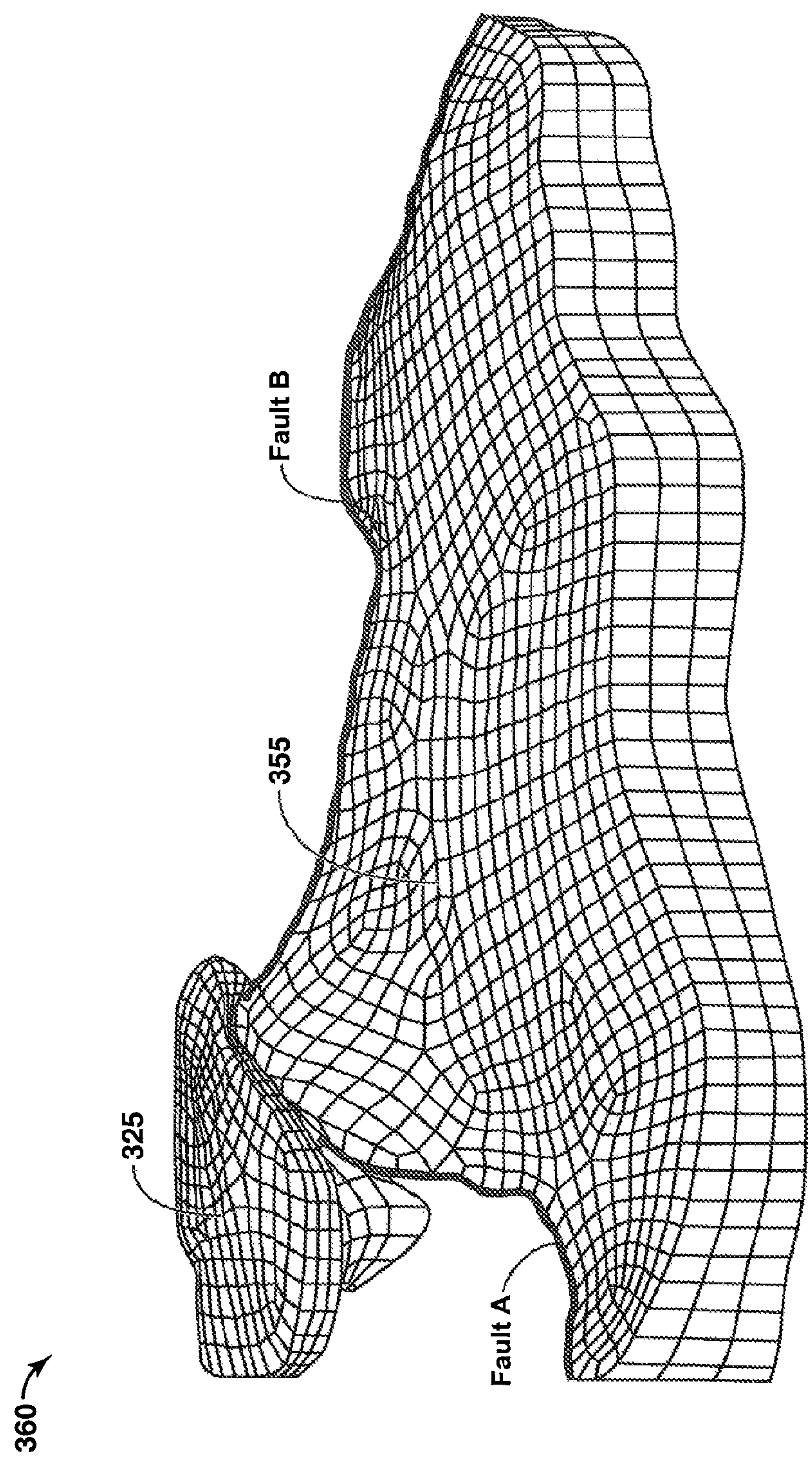
FIG. 3B is an exemplary three-dimensional (3-D), finite element modeled geomechanics model for the exemplary field.

FIG. 3A is a collection of perspective views of a three-dimensional (3-D) geomechanics model for an exemplary field. FIG. 3B is an exemplary three-dimensional (3-D), finite element modeled geomechanics model for the exemplary field. Referring to FIGS. 3A and 3B, a three-dimensional finite-element model (FIG. 3B) is constructed based on a geologic model (FIG. 3A) and seismic interpretation available. Constitutive models and rock material properties are assigned based on well logs, core, and pressure test results. For example, FIGS. 3A and 3B correspond to blocks 110-140 of process 100 (FIG. 1). A reservoir simulation model 300, which includes a full reservoir model 310, a model of a salt body 320, a model of the underburden 330, a model of the salt and reservoir sideburdens 340, and the reservoir model 350, based on the planned exploitation strategy serves as the boundary conditions for the geomechanical modeling. In FIG. 3B, the three-dimensional finite element model 360 includes a salt dome model 325 and a reservoir model 355, with a pair of faults (Fault A, Fault B) shown along the edges of the reservoir 355.

Figure 4:
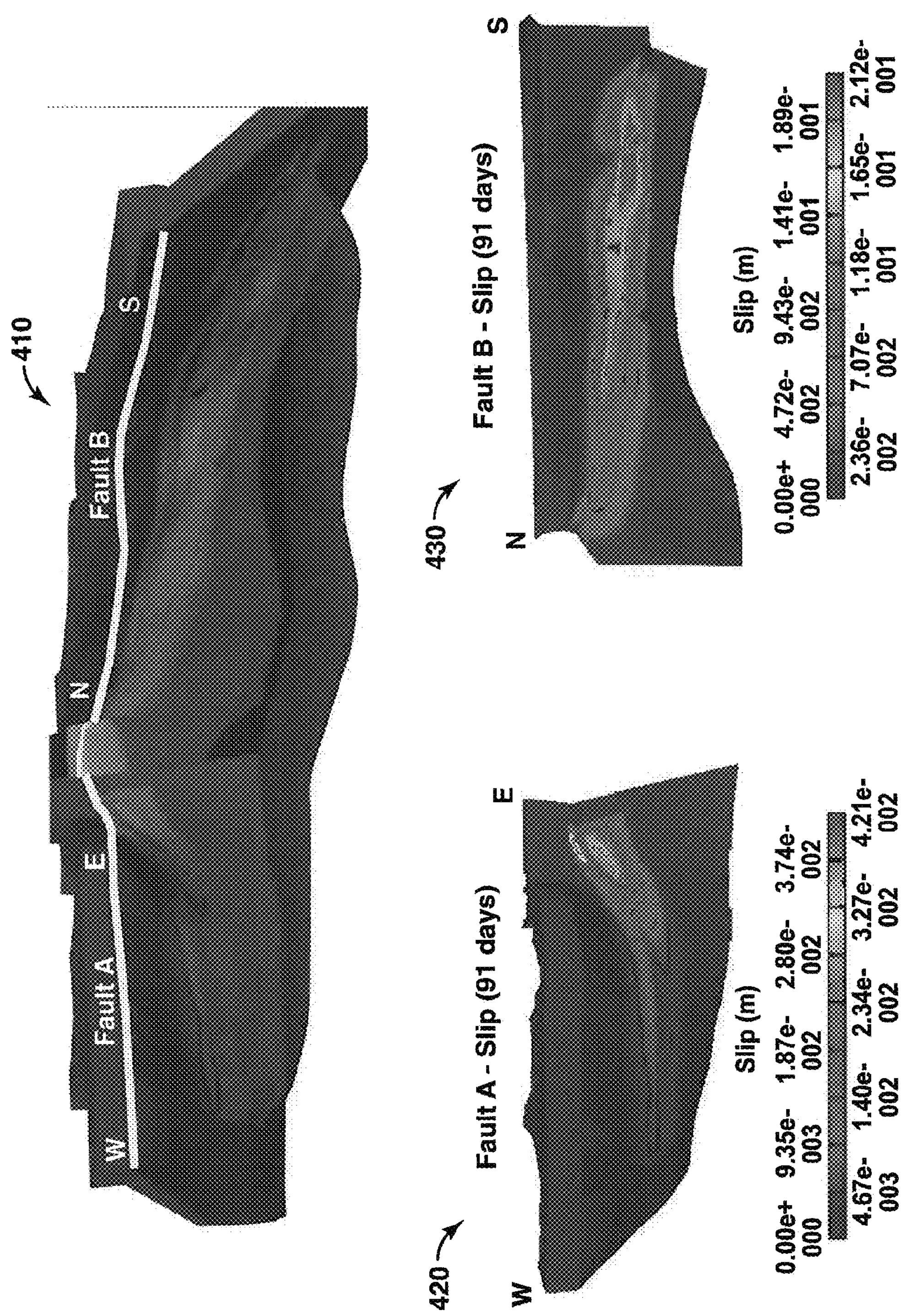
FIG. 4 is a collection of exemplary screenshots of graphical results from the geomechanics modeling, showing the magnitude of fault slips plotted along the two fault planes from the exemplary field of FIG. 3B.

FIG. 4 is a collection of exemplary screenshots of graphical results from the geomechanics modeling, showing the magnitude of fault slips plotted along the two fault planes from the exemplary field of FIG. 3B. Referring to FIG. 4, the fault slips along the two modeled fault planes are shown together in a first screenshot 410, and separately with each fault plane's individual slip (in meters) shown graphically (420, 430) with higher slip occurring in the regions represented with colors on the red end of the spectrum than the blue end of the spectrum, e.g., slip increases from blue regions to red regions in FIG. 4.

Figure 5:
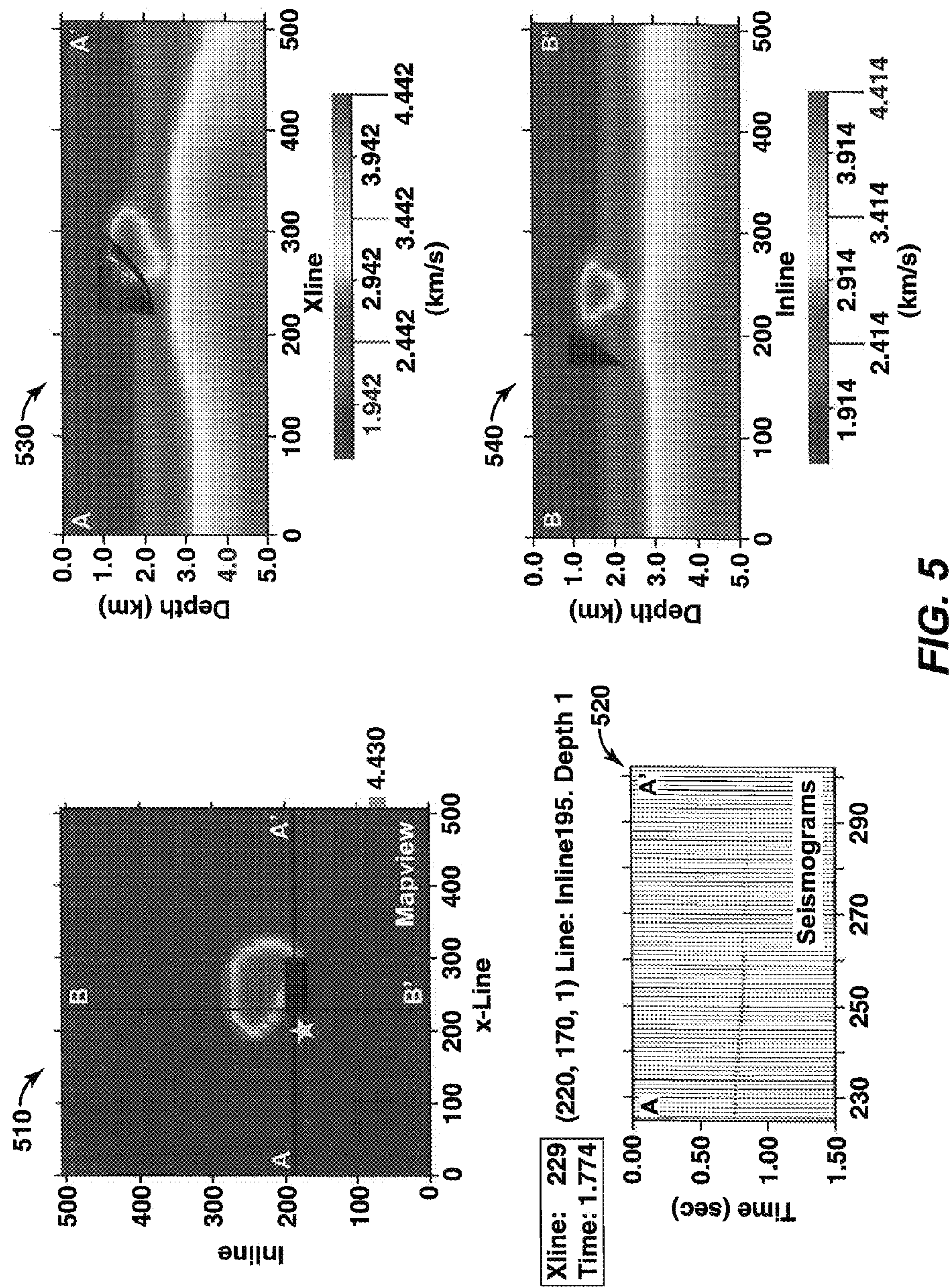
FIG. 5 is a collection of exemplary screenshots of graphical results showing ray tracing results in a 3-D model (Vp, Qp) utilizing a 3-D seismic modeling system.

FIG. 5 is a collection of exemplary screenshots of graphical results showing ray tracing results in a 3-D model (Vp, Qp) utilizing a 3-D seismic modeling system. Referring to FIG. 5, seismic moment is estimated and the resulting seismic amplitude is compared with the noise statistics. In FIG. 5, a map-view 510 having two sectional lines A-A' and B-B' includes x-y axes defining an xline and inline coordinate plane. A representative seismogram 520 along the A-A' sectional line (and plotted along x-axis of xline and y-axis of time) and a pair of individual views taken along A-A' (530) and B-B' (540) provide ray tracing results with respect to depth (in kilometers).

Figure 6:
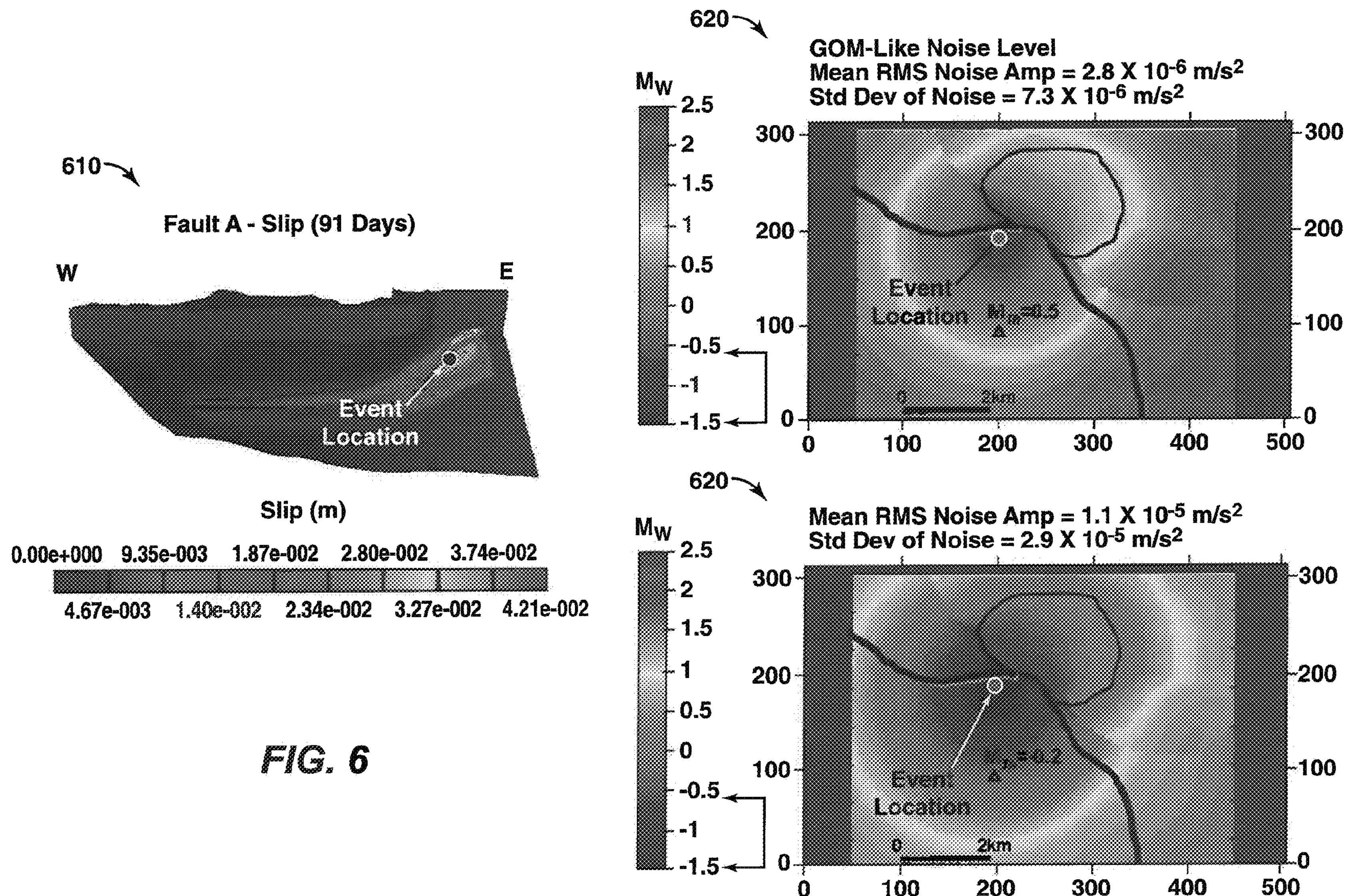
FIG. 6 is a collection of graphical results obtained from consistency and seismic analyses.

FIG. 6 is a collection of graphical results obtained from consistency and seismic analyses. Referring to FIG. 6, a summary of the analyses and the threshold magnitude maps for seismic detection are displayed in FIG. 6. At 610, event location is shown for fault A, along with slip, e.g., similar to FIG. 4, and at 620 mean RMS noise amplitude, standard deviation of noise. The fault A event metrics include a critical energy release rate Gc of 43,000 J/m$^2$, a predicted seismic moment (Mo) of $2.2\times10^{13}$ Nm, and a predicted seismic moment magnitude of 2.8.

Figure 7:
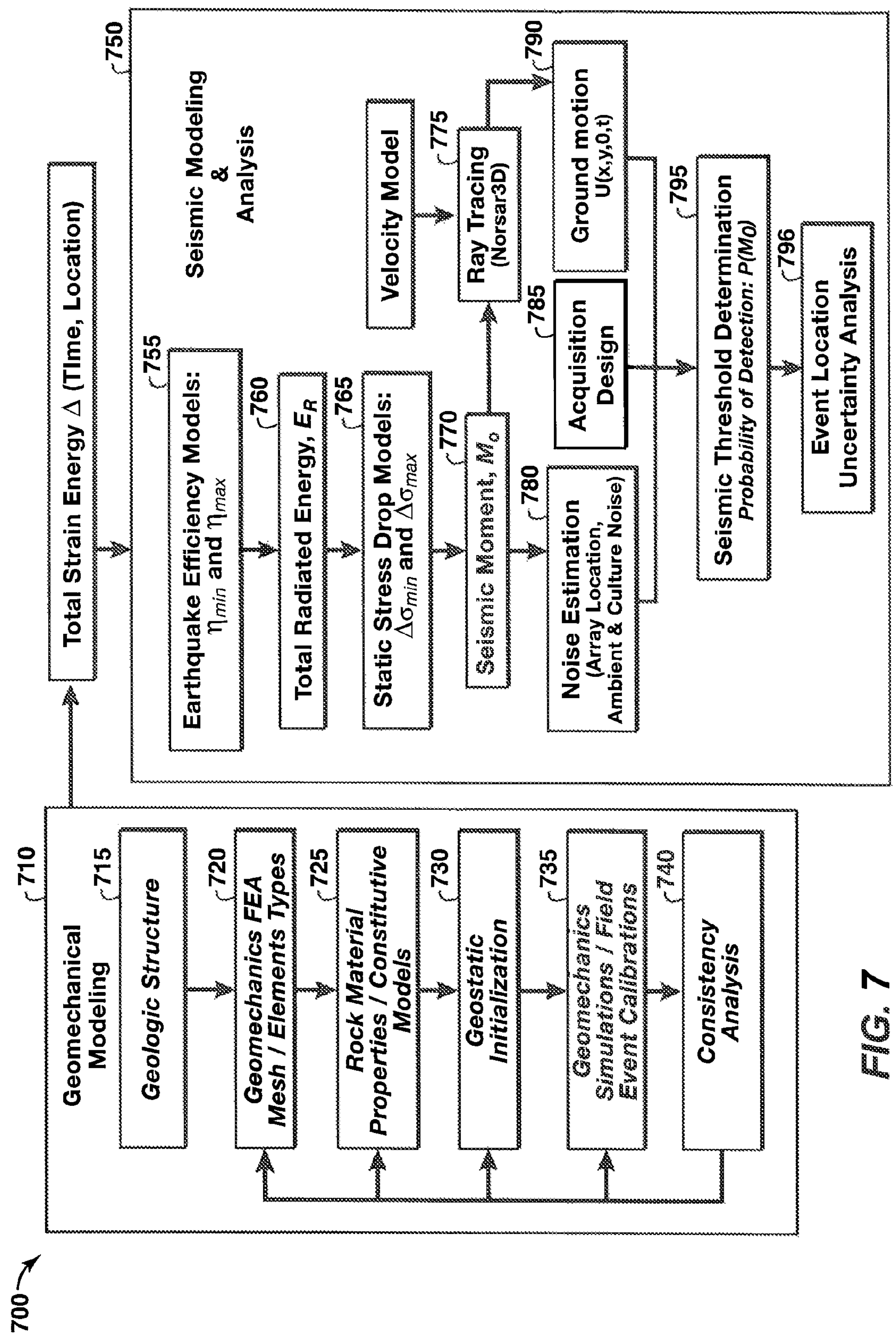
FIG. 7 is a flowchart of an exemplary process for integrating results calculated from geomechanical modeling into seismic modeling and analysis.

FIG. 7 is a flowchart of an exemplary process 700 for integrating results calculated from geomechanical modeling into seismic modeling and analysis. Referring to FIG. 7, an exemplary process 700 includes details of how geomechanical modeling 710 may be integrated with seismic modeling and analysis 750. For example, the geomechanical modeling 710 includes defining the geologic structure 715 of the subsurface region. The geologic structure is then used to perform integrated geomechanics modeling, e.g., block 140 in FIG. 1, and consistency analysis, e.g., block 150 in FIG. 1. The integrated geomechanics modeling and consistency analysis of FIG. 7 includes iterative determinations of geomechanics finite element analysis mesh and element types 720, determining and modeling rock material properties and constitutive models 725, geostatic initialization 730, geomechanics simulations and field event calibrations 735, and consistency analysis 740. The geomechanical modeling 710 is used to determine total strain energy, e.g., recoverable and dissipated energies, with time (and location). The seismic modeling and analysis 750 uses the determinations of total strain energy from the geomechanical modeling 710 to determine feasibility of passive seismic surveys based on passive sources meeting the seismic threshold determinations. Specifically, seismic modeling and analysis 750 includes determining or modeling earthquake efficiency models 755, total radiated energy 760, static stress drop models 765, and seismic moment 770. A velocity model of the subsurface region is integrated with ray tracing 775 and used for noise estimation 780, e.g., array location, ambient noise, cultural noise, acquisition design 785, and ground motion analysis 790. Determinations of seismic thresholds 795, e.g., probability of detection by the network and event location uncertainty analysis 796 are used to assess the viability of passive seismic monitoring in the location. For example, the fault A-Event metrics shown in FIG. 6 are representative of seismic event metrics that may be generated by the process 700.

A number of embodiments have been described. Nevertheless, it will be understood that various modifications may be made without departing from the spirit and scope of the invention. For example, with respect to FIGS. 1-6, one or more steps of process 100 (and/or screenshots from FIGS. 3A-6) may be performed with the use of commercially available seismic modeling software modules or systems. For example, the NORSAR-3D™ modeling package may be used to implement one or more of the process steps of process 100 shown in connection with FIGS. 3A-6. The NORSAR-3D™ modeling package provides 3D model representation techniques, e.g., the Open Ray Model, which permit seismic ray tracing in a preliminary or incomplete depth model, e.g., interfaces may have holes or other undefined areas.

Production data may be acquired from at least one well within the subsurface region. The fluid-flow of the reservoir may be simulated in a manner of ways, but may include building multiscenario interpretations that include establishing system fluid exits and paths to fluid exits using seismic data, e.g., 2D, 3D or 4D seismic and production data. Fluid pressure evolution may be evaluated and reconciled with production data and with fluid contacts and pressure evolution, and/or with any changes in chemistry of produced fluids with the multiscenario interpretations of compartments, connections, and/or fluid properties.

The aforementioned processes and/or techniques are directed at determining the feasibility of performing effective passive seismic surveys based on one or more passive seismic sources. Specifically, many kinds of natural seismic energy may be recorded and used to evaluate the subsurface region, including, but not limited to earthquakes, fluid flow disturbances, e.g., magnetic or hydrothermal, energy release from power plants, microseismic tremors, ocean wave noise, cultural noise, remote nuclear testing, induced stresses from production related activities, such as drill bit sourced noises, and any other seismic source (natural or artificial) that contributes to acoustic illumination in the subsurface region. The paper entitled "The Untapped Potential of Seismic Imaging," by Peter B. Edwards, GEOPHYSICS: *The Leading Edge of Exploration*, August, 1992, pp. 29-34, describe specific details of exemplary passive seismic surveys that may be conducted once the feasibility of effective passive seismic monitoring has been validated by one or more of the foregoing techniques, e.g., such as process 100.

One or more of the aforementioned processes and/or techniques, e.g., such as the integration of process 100 to include a passive seismic survey, can be implemented in digital electronic circuitry, or in computer hardware, firmware, software, or in any combination thereof. Any of the aforementioned functionality may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One or more process steps of the invention can be performed by one or more programmable processors executing a computer program to perform functions of the invention by operating on input data and generating output. One or more steps can also be performed by, and an apparatus or system can be implemented as, special purpose logic circuitry, e.g., an FPGA (field programmable gate array) or an ASIC (application-specific integrated circuit). In addition, data acquisition and display may be implemented through a dedicated data collection and/or processing system, e.g., containing data acquisition hardware, such as hydrophones and/or geophones, a processor(s), and various user and data input and output interfaces, such as a display component for graphically displaying one or more of the generated connectivity models obtained through any of the aforementioned process steps or processes.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

All such modifications and variations are intended to be within the scope of the foregoing embodiments, as defined in the appended claims. For example, persons skilled in the art will also readily recognize that in preferred embodiments, at least some of the method steps method are performed on a computer, e.g., the method may be computer implemented. In such cases, the resulting model parameters may either be downloaded or saved to computer memory.

The invention claimed is:

1. A method for determining time-varying stress and strain fields within a subsurface region, the method comprising:

integrating a seismic model of a reservoir within the subsurface region with a geomechanical model of the subsurface region; and determining an estimate of the time-varying stress and strain fields within the subsurface region during production of the reservoir, wherein the estimate is based on the integration of the seismic model with the geomechanical model.

2. The method according to claim 1, wherein the seismic model provides a reservoir simulation of production related fluid-flow within the reservoir.

3. The method according to claim 1, wherein the geomechanical model provides an estimate of rock and fracture mechanics within the subsurface region.

4. The method according to claim 1, wherein integrating the seismic model of the reservoir with the geomechanical model comprises:

integrating a reservoir simulation of the reservoir during production and a geologic model of the subsurface region.

5. The method according to claim 4, further comprising integrating well log and core test data with the geomechanical model.

6. The method according to claim 5, wherein integrating the seismic model of the reservoir with the geomechanical model comprises creating a three-dimensional finite element model of the subsurface region incorporating parameters associated with structure of the reservoir and overburden of the region with rock material properties and failure criteria.

7. The method according to claim 1, wherein integrating the seismic model of the reservoir with the geomechanical model comprises creating a three-dimensional finite element model of the subsurface region by incorporating parameters associated with structure of the reservoir and overburden of the region with rock material properties and failure criteria.

8. The method according to claim 1, further comprising generating the seismic model and the geomechanical model, wherein the seismic model includes a reservoir flow simulation including pressure and temperature changes within the reservoir.

9. The method according to claim 8, wherein the geomechanical model includes a stress analysis of the subsurface region.

10. The method according to claim 9, further comprising mapping solution histories of pressure and temperature from the seismic model to the geomechanical model as boundary conditions.

11. A method for determining feasibility of a passive seismic survey for a subsurface region, the method comprising:

integrating a seismic model of a reservoir within the subsurface region with a geomechanical model of the subsurface region to form an integrated, three-dimensional model of the subsurface region; and determining an estimate of the time-varying stress and strain fields within the subsurface region during production of the reservoir, wherein the estimate is based on the integrated, three-dimensional model;

analyzing earthquake energetics and consistency from the integrated, three-dimensional model;

modeling seismic wave propagation to model and correct for path effects to predict seismic signal amplitudes for a given seismic moment for at least one receiver location; and determining a seismic threshold for a seismic data acquisition network, wherein the at least one receiver is part of the seismic data acquisition network.

12. The method according to claim 11, wherein the seismic model provides a reservoir simulation of production related fluid-flow within the reservoir.

13. The method according to claim 11, wherein the geomechanical model provides an estimate of rock and fracture mechanics within the subsurface region.

14. The method according to claim 1, wherein integrating the seismic model of the reservoir with the geomechanical model comprises:

integrating a reservoir simulation of the reservoir during production and a geologic model of the subsurface region.

15. The method according to claim 14, further comprising integrating well log and core test data with the geomechanical model.

16. The method according to claim 11, wherein the integrated, three-dimensional model comprises a three-dimensional finite element model of the subsurface region incorporating parameters associated with structure of the reservoir and overburden of the region with rock material properties and failure criteria.

17. The method according to claim 11, further comprising generating the seismic model and the geomechanical model, wherein the seismic model includes a reservoir flow simulation including pressure and temperature changes within the reservoir and the geomechanical model includes a stress analysis of the subsurface region.

18. The method according to claim 17, further comprising mapping solution histories of pressure and temperature from the seismic model to the geomechanical model as boundary conditions.

19. The method according to claim 11, wherein analyzing earthquake energetics and consistency comprises predicting changes in total strain energy with time.

20. The method according to claim 19, further comprising calculating total radiated energy available for seismic wave propagation from the predicted changes in total strain energy with time.

21. The method according to claim 20, further comprising estimating seismic moment due to induced stress perturbations within the subsurface region.

22. The method according to claim 21, wherein the induced stress perturbations comprise injection and production-induced stress perturbations.

23. The method according to claim 11, wherein analyzing earthquake energetics comprises determining average displacement, radiated seismic energy, and total recoverable strain field from the geomechanical model.

24. The method according to claim 15, wherein modeling seismic wave propagation to model and correct for path effects to predict seismic signal amplitudes for a given seismic moment for at least one receiver location includes forward wave propagation modeling to model and correct for path effects due to geometric spreading, reflection/transmission loss, and anelastic attenuation.

25. The method according to claim 11, wherein determining the seismic threshold for the seismic data acquisition network comprises determining an estimate of detection capability for the seismic data acquisition network based on seismic signal strength, seismic background noise, seismic recurrence rates, and recording equipment.

26. The method according to claim 25, wherein the estimate is an estimated magnitude at which more than 90 percent of a plurality of receiver stations can detect an event.

27. The method according to claim 26, further comprising generating a detection threshold map containing a detection threshold magnitude for each grid of the integrated, three-dimensional model.

28. The method according to claim 11, further comprising producing hydrocarbons from the reservoir and conducting a passive seismic survey of the reservoir during production of hydrocarbons.

29. The method according to claim 28, further comprising monitoring overpressure and seal breach risk in the reservoir based on the results of the passive seismic survey.

30. A tangible computer-readable storage medium having embodied thereon a computer program configured to, when executed by a processor, generate an integrated, three-dimensional model of a subsurface region based on geomechanical and seismic analysis of the subsurface region, the medium comprising one or more code segments configured to:

integrate a seismic model of a reservoir within the subsurface region with a geomechanical model of the subsurface region to form the integrated, three-dimensional model of the subsurface region, wherein the seismic model provides a reservoir simulation of production related fluid-flow within the reservoir and the geomechanical model provides an estimate of rock and fracture mechanics within the subsurface region; and to determine an estimate of the time-varying stress and strain fields within the subsurface region during production of the reservoir, wherein the estimate is based on the integrated, three-dimensional model.

31. The computer-readable storage medium according to claim 30, further comprising code segments configured to:

analyze earthquake energetics and consistency from the integrated, three-dimensional model;

model seismic wave propagation to model and correct for path effects to predict seismic signal amplitudes for a given seismic moment for at least one receiver location; and determine a seismic threshold for a seismic data acquisition network, wherein the at least one receiver is part of the seismic data acquisition network.

32. The computer-readable storage medium according to claim 31, further comprising code segments configured to integrate the seismic model of the reservoir with the geomechanical model by integrating:

a reservoir simulation of the reservoir during production;

a geologic model of the subsurface region; and well log and core test data with the geomechanical model.

* * * * *